US012528686B2

(12) United States Patent
Barlow et al.

(10) Patent No.: US 12,528,686 B2
(45) Date of Patent: Jan. 20, 2026

(54) VEHICLE APPARATUS WITH AN ELEVATABLE PLATFORM USED FOR BUILDING A STRUCTURE

(71) Applicant: Innovatech Systems, LLC, Kanarraville, UT (US)

(72) Inventors: James Barlow, Colorado City, AZ (US); James Harker, Colorado City, AZ (US)

(73) Assignee: Innovatech Systems, LLC, Kanarraville, UT (US)

( * ) Notice: Subject to any disclaimer, the term of this patent is extended or adjusted under 35 U.S.C. 154(b) by 1102 days.

(21) Appl. No.: 17/526,871

(22) Filed: Nov. 15, 2021

(65) Prior Publication Data

US 2022/0371868 A1 Nov. 24, 2022

Related U.S. Application Data

(60) Provisional application No. 63/189,780, filed on May 18, 2021.

(51) Int. Cl.
*B66F 11/04* (2006.01)
*B66F 17/00* (2006.01)

(52) U.S. Cl.
CPC .......... *B66F 11/042* (2013.01); *B66F 17/006* (2013.01)

(58) Field of Classification Search
CPC .... B66F 11/042; B66F 17/006; B66F 11/044; B66F 7/28; B66F 9/127
USPC .............. 182/69.5, 222, 130–131, 63.1–69.6
See application file for complete search history.

(56) References Cited

U.S. PATENT DOCUMENTS

| | | | | |
|---|---|---|---|---|
| 3,961,681 | A * | 6/1976 | Fisher | B60P 1/02 182/69.5 |
| 4,599,030 | A * | 7/1986 | Skaalen | B62D 7/1509 187/244 |
| 5,470,175 | A * | 11/1995 | Jensen | E01C 19/182 414/346 |
| 6,571,913 | B2 * | 6/2003 | Puszkiewicz | B66F 9/165 182/69.5 |
| 8,590,921 | B2 * | 11/2013 | Benson | E06C 1/397 182/123 |
| 2001/0045220 | A1 * | 11/2001 | Fara | B08B 15/04 15/301 |
| 2010/0230210 | A1 * | 9/2010 | Hanks | B60P 3/08 182/113 |
| 2010/0294592 | A1 * | 11/2010 | Crook | B66F 11/044 182/113 |
| 2012/0186908 | A1 * | 7/2012 | Crook | E04G 1/22 182/69.5 |
| 2017/0283229 | A1 * | 10/2017 | Shi | B66F 11/042 |
| 2019/0119088 | A1 * | 4/2019 | Puszkiewicz | B66F 13/00 |
| 2021/0380279 | A1 * | 12/2021 | Prendergast | B64F 5/10 |
| 2022/0098017 | A1 * | 3/2022 | Di Florio | B60L 50/60 |

\* cited by examiner

*Primary Examiner* — Christopher Garft
(74) *Attorney, Agent, or Firm* — Gurr & Brande, PLLC; Robert A. Gurr (57) ABSTRACT

A vehicle apparatus has a chassis with a plurality of rear wheels (e.g., flotation axel wheels) and a plurality of front wheels (e.g., drive/steer wheels) coupled thereto. A scissor lift assembly may couple to the chassis and hoist and lower a man basket. The man basket has hinged sides that may be released to a horizontal position, thereby extending the working platform of a user. A rotatable pedestal allows a central tie-off spot for added safety and efficacy.

16 Claims, 14 Drawing Sheets

VEHICLE APPARATUS WITH AN ELEVATABLE PLATFORM USED FOR BUILDING A STRUCTURE

CROSS-REFERENCE TO RELATED APPLICATIONS

This application claims the benefit of U.S. Provisional Application Ser. No. 63/189,780 filed on May 18, 2021, which is incorporated herein by reference in its entirety.

TECHNICAL FIELD

The present disclosure relates to a vehicle apparatus. More particularly, the present disclosure relates to a vehicle apparatus with an elevatable work platform that is used to install and assemble, among other things, steel frames and upfits for routing necessary HVAC or other equipment.

BACKGROUND

Building construction is an inherently dangerous activity. Heavy materials, large equipment, and heights all create added risk. This is particularly true for steel construction framework assembly and installation. Often, as the building construction progresses, additional steel frames and other miscellaneous steel items and upfits must be installed for routing necessary HVAC or other equipment before concrete floors can be poured. However, access to install these additional steel frames and other steel items underneath unfinished mezzanine levels with standard extendable or elevated platform equipment, such as ladders, scaffolding, forklifts, boom lifts, and scissor lifts may be extremely difficult and time consuming. Accordingly, many workers are forced to be creative in installing HVAC, which may lead to dangerous situations.

When installing the steel frames, it is not uncommon to have many workers underneath unfinished mezzanines, usually at dangerous heights, interacting with dangerous tools, machinery, and other components. The more workers positioned under the mezzanine with dangerous tools, the higher the odds of an accident. Additionally, it becomes extremely difficult to maneuver underneath mezzanines with ladders or other typical extendable platform equipment. Additionally, elevatable platforms in the art, such as scissor lifts, have a relatively small working platform, requiring constant movement of the device, which is time-consuming and dangerous.

Accordingly, there is a need for a vehicle that can maneuver underneath a mezzanine from joint to joint in a fast, efficient, and safe manner, and that further allows a worker to safely ascend and descend when performing welding or installation tasks, and that further allows a large working space without the need to relocate the vehicle. The present invention seeks to solve these and other problems.

SUMMARY OF EXAMPLE EMBODIMENTS

In one embodiment, a vehicle apparatus comprises a chassis with a plurality of rear wheels (e.g., flotation axle wheels) and a plurality of front wheels (e.g., drive/steer wheels) coupled thereto. The chassis may further comprise a plurality of forklift pockets that allow the vehicle apparatus to be transported by a forklift. A first side of the chassis may comprise an electrical compartment interposed between the plurality of rear wheels and the plurality of front wheels. In a similar manner, on a second side of the chassis, a hydraulic compartment may be coupled thereto and interposed between the plurality of rear wheels and the plurality of front wheels. A front side of the chassis may comprise a welder/generator that supplies power to a welding device and/or operation of the vehicle apparatus.

A scissor lift assembly may couple to the chassis and be coupled to a hydraulic shaft. When activated, the scissor lift assembly is capable of moving up and down on a y-axis. Further, a man basket may be coupled to the scissor lift assembly. The man basket may be a variety of sizes so as to hold one or more workers. The man basket may comprise a base with an entrance platform, folding entrance rails, a first side dropdown platform extension, a second side dropdown platform extension, and a bench platform, all of which may be hingedly coupled to the base, allowing each of the platforms and rails to lay flat and increase the size of the work area. To operate the vehicle apparatus and raise or lower the man basket, a user may use ground controls and/or man basket controls.

DETAILED DESCRIPTION OF EXAMPLE EMBODIMENTS

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously described, there is a need for a vehicle that can maneuver underneath a mezzanine from joint to joint in a fast, efficient, and safe manner, that allows a worker to safely ascend and descend when performing welding or installation tasks, and that provides a large working area for the worker. The present invention seeks to solve these and other problems.

When installing steel frames, it is not uncommon to have many workers underneath unfinished mezzanines, usually at dangerous heights and interacting with dangerous tools. Typically, to install these steel frame and steel components, a user would employ a ladder or other extendable platform that was not designed for installing such components. Improvising with, for example, a ladder may lead to injury or, in some circumstances, death.

To address the shortcomings in the prior art, the vehicle apparatus described herein increases safety while working under unfinished mezzanines. The vehicle apparatus comprises a chassis with wheels and a man basket that may be moveable on a y-axis via ground or man basket controls. The man basket comprises dropdown platform extensions to increase working space. It will be appreciated that the vehicle apparatus allows a user to maneuver and work beneath a mezzanine or other structure efficiently, thereby promoting safe working conditions. It will further be appreciated that the vehicle apparatus is suited for use in scenarios where heavy loads need to be transported and when other extendable platforms are not an appropriate option.

Figure 1:
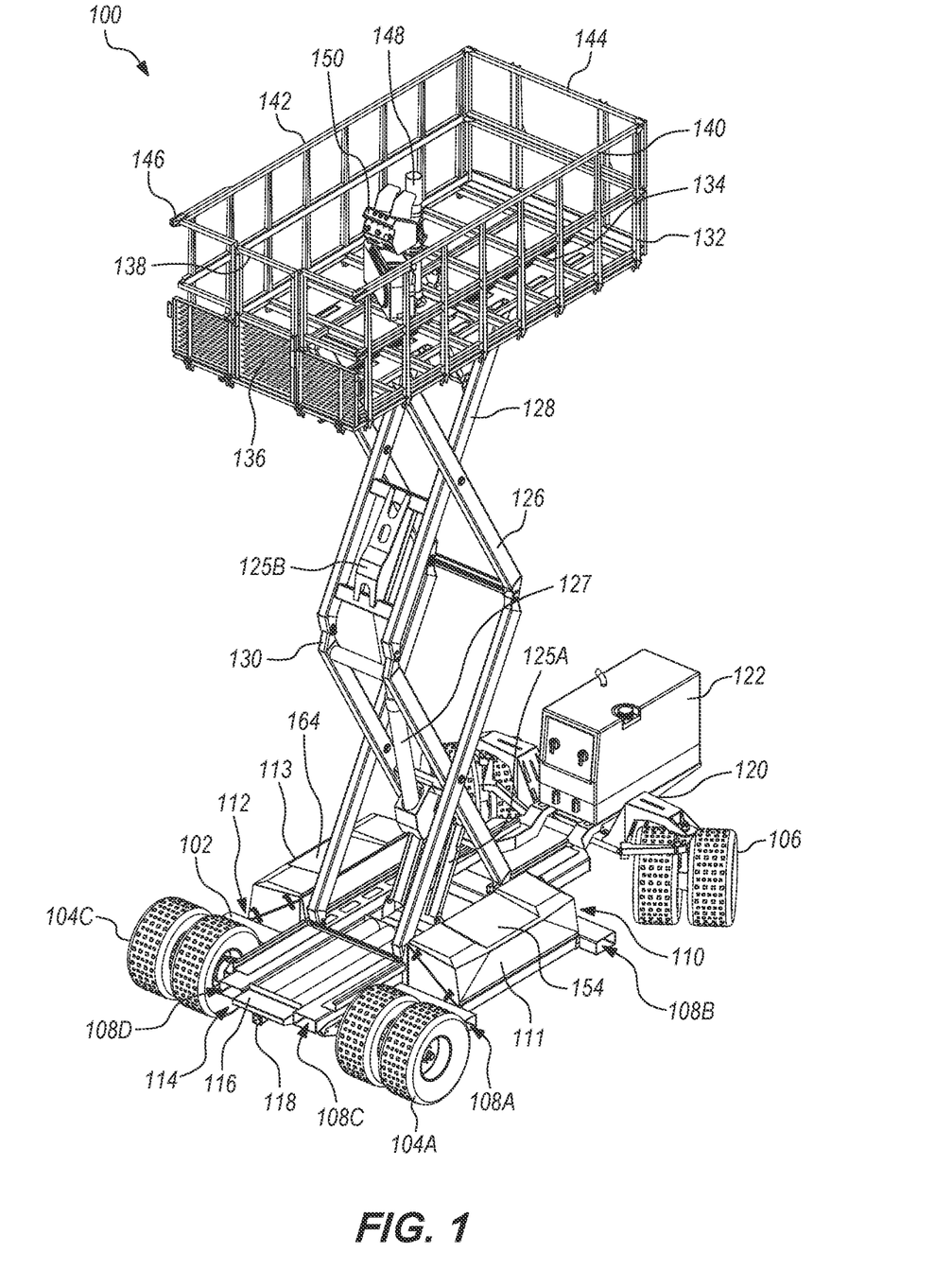
FIG. 1 illustrates a rear, left side perspective view of a vehicle apparatus in an extended position.
Figure 2:
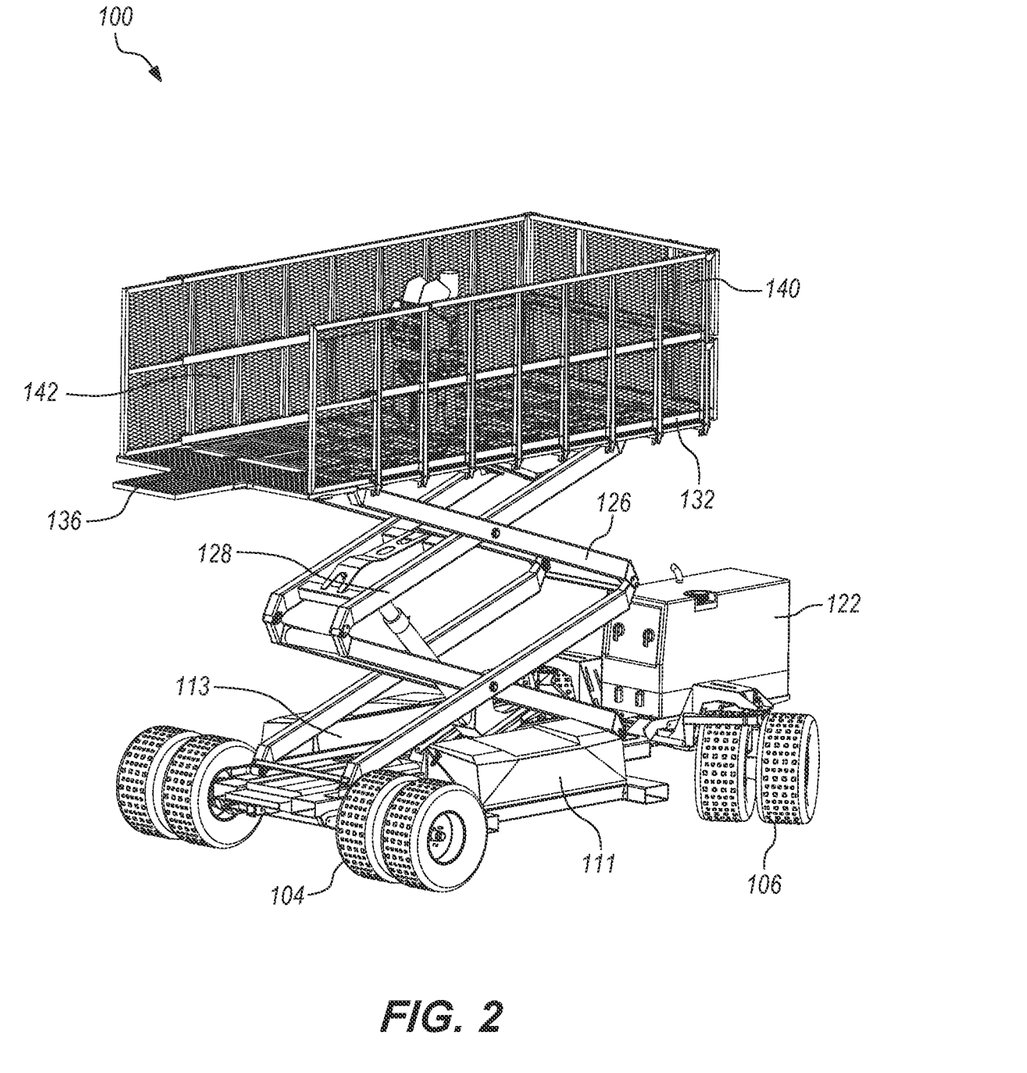
FIG. 2 illustrates a rear, left side perspective view of a vehicle apparatus in a partially extended position.
Figure 3:
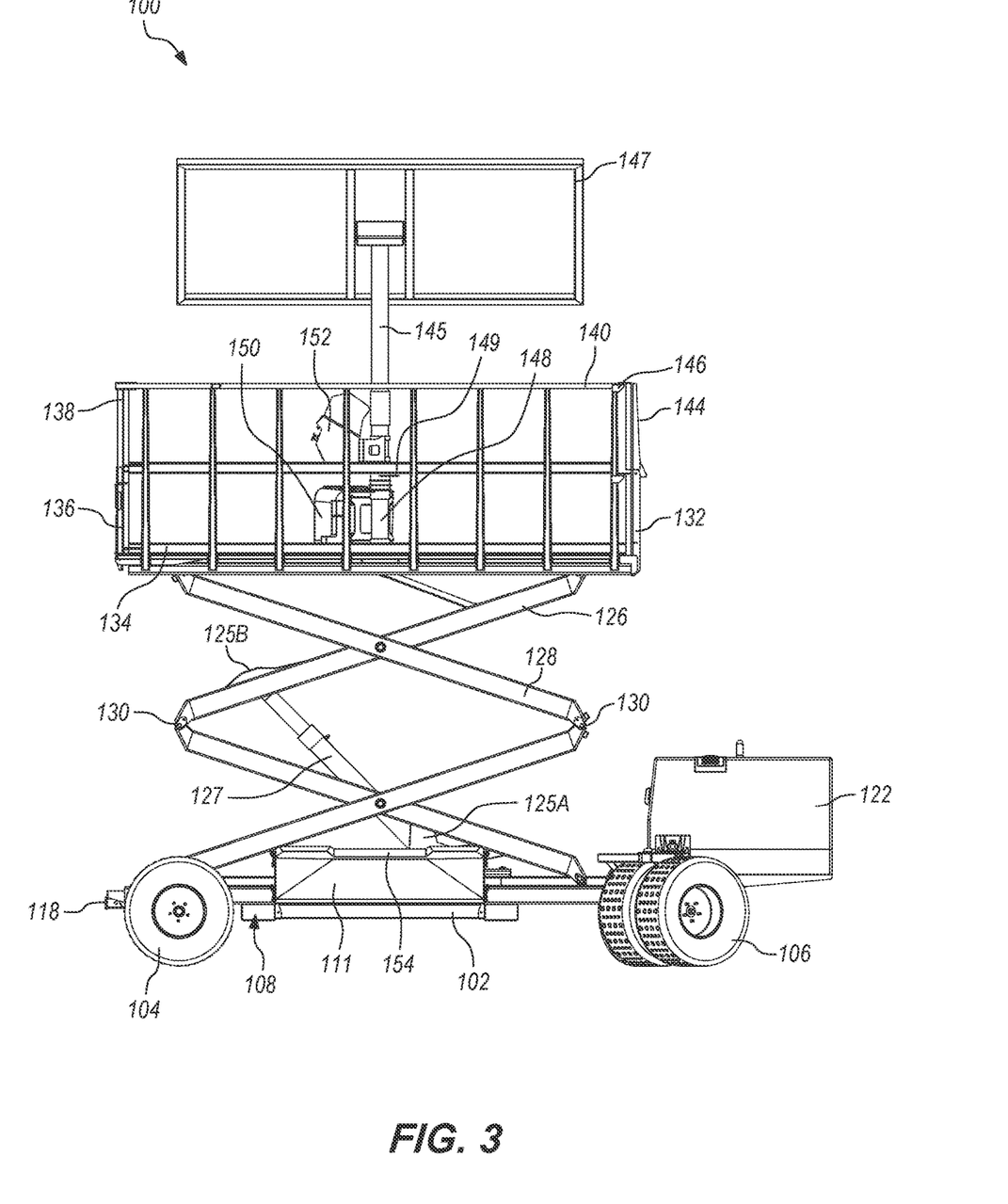
FIG. 3 illustrates a left side elevation view of a vehicle apparatus.

As shown in FIGS. 1-3, in one embodiment, a vehicle apparatus 100 comprises a chassis 102 with a plurality of rear wheels 104A-D (e.g., flotation axel wheels) and a plurality of front wheels 106A-D (e.g., drive/steer wheels) coupled thereto. In some embodiments, the plurality of rear wheels 104A-D and front wheels 106A-D may be motor driven. In addition, in some embodiments, the plurality of rear wheels 104A-D and/or front wheels 106A-D may be high flotation all terrain tires which allow for fully distributed loads on surfaces that limit the amount of weight that can be supported, such as on corrugated steel decking material. The chassis 102 may further comprise a plurality of forklift pockets 108A-D that allow the vehicle apparatus 100 to be transported by a forklift.

A first side 110 of the chassis 102 may comprise an electrical compartment 111 interposed between the plurality of rear wheels 104A-D and the plurality of front wheels 106A-D. In a similar manner, on a second side 112 of the chassis 102, a hydraulic compartment 113 may be coupled thereto and interposed between the plurality of rear wheels 104A-D and the plurality of front wheels 106A-D. While the electrical compartment 111 and the hydraulic compartment 113 are illustrated as being on the first and second sides 110, 112, respectively, it will be appreciated that the electrical compartment 111 and the hydraulic compartment 113 may be positioned anywhere on the chassis 102 or any other location on the vehicle apparatus 100. In addition, a rear side 114 of the chassis 102 may comprise a platform step 116 that assists a user onto the vehicle apparatus 100 and a receiver hitch 118 so as to allow a user to couple a vehicle to the vehicle apparatus 100 for transportation. Lastly, a front side 120 of the chassis 102 may comprise a welder/generator 122 that supplies power to a welding device and/or operation of the vehicle apparatus 100.

As shown in FIGS. 4-8, in some embodiments, pneumatic cylinders 124 (best shown in FIG. 5) may be coupled to the chassis 102. In addition, the pneumatic cylinders 124 may be coupled to a first bracket 125A that couples to a scissor lift assembly 126. The scissor lift assembly 126 may couple to the chassis 102. A hydraulic shaft 127 is also coupled to the first bracket 125A and the scissor lift assembly 126 via a second bracket 125B, which, when activated, is capable of actuating the scissor lift assembly 126. It will be appreciated that the scissor lift assembly 126 comprises a plurality of lever arms 128. In some embodiments, the ends of two of the lever arms 128 may be coupled together via hinges 130.

A man basket 132 may be coupled to the scissor lift assembly 126. The man basket 132 may be a variety of sizes so as to hold one or more workers. The man basket 132 may comprise a base 134 with an entrance gate 136, entrance rails 138, a first side dropdown platform extension 140, a second side dropdown platform extension 142, and a bench platform 144 all of which may be hingedly coupled to the base 134. Further, the entrance rails 138, the first and second side dropdown platform extensions 140, 142, and the bench platform 144 may be coupled to each other via removably attachable pins 146 or other mechanisms (e.g., cotter pins, bolts, etc.). It will be appreciated that the entrance gate 136, the entrance rails 138, the first side dropdown platform extension 140, the second side dropdown platform extension 142, and the bench platform 144 may all be configured to lay flat or, in other words, be positioned so as to be level with the base 134 and horizontal to the ground, creating a walking platform for a worker. It will further be appreciated that a user may release (i.e., place horizontally) a single side, such as the bench platform 144, while the rest of the sides (e.g., 136, 140, 142) stay in an upright, locked position. The bench platform 144 may be configured to fold in half so as to create a bench where tools may be placed (shown in FIG. 8). In addition, when the entrance gate 136, the entrance rails 138, the first side dropdown platform extension 140, the second side dropdown platform extension 142, and the bench platform 144 are in a flat, horizontal position, the base 134 is essentially extended so as to allow additional workspace and prevent frequent repositioning of the vehicle apparatus 100 at an elevated position. It also discourages climbing upon and/or leaning over the platforms and rails and promotes safe working conditions.

Figure 4:
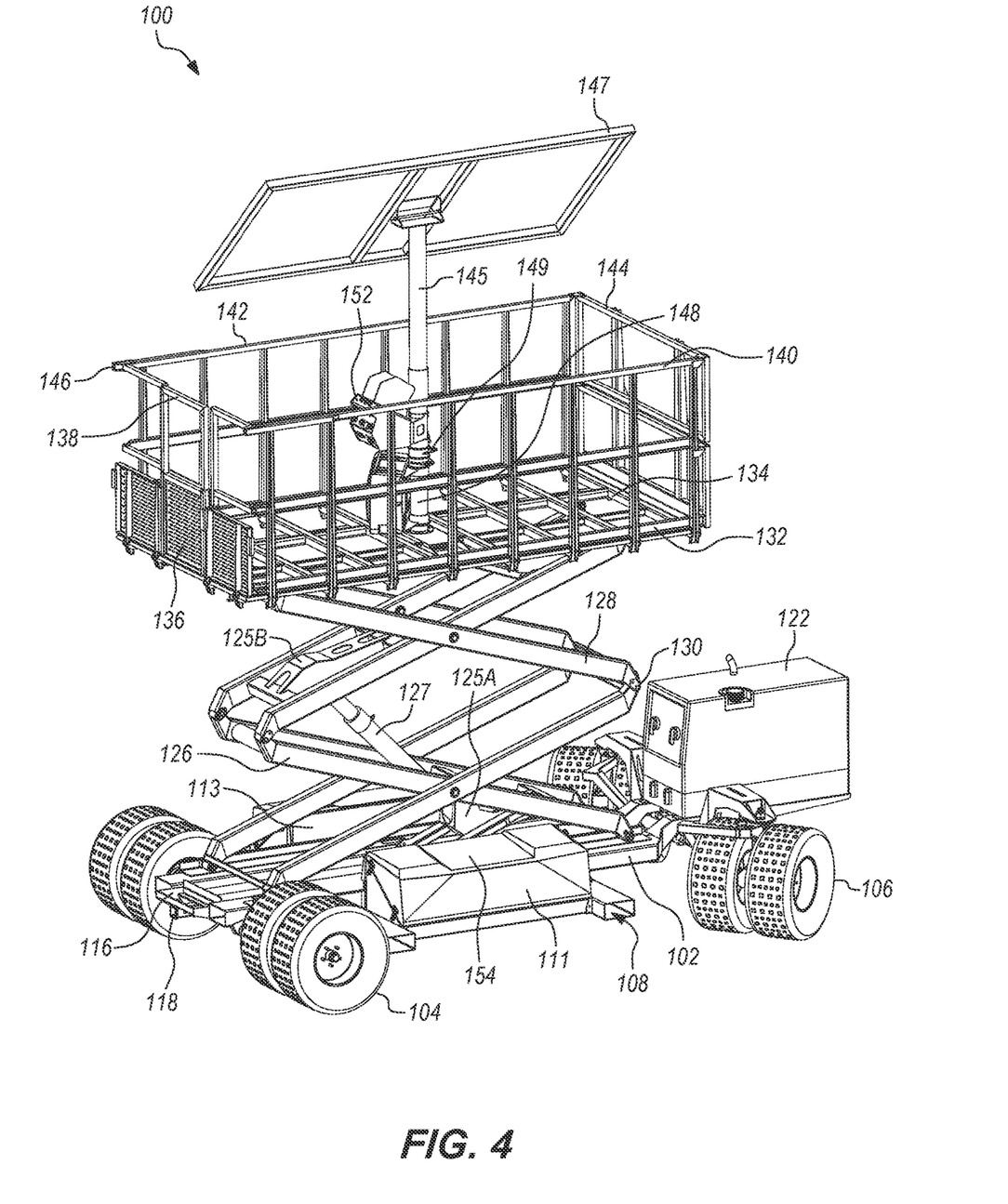
FIG. 4 illustrates a left side perspective view of a vehicle apparatus with a frame set coupled thereto.
Figure 5:
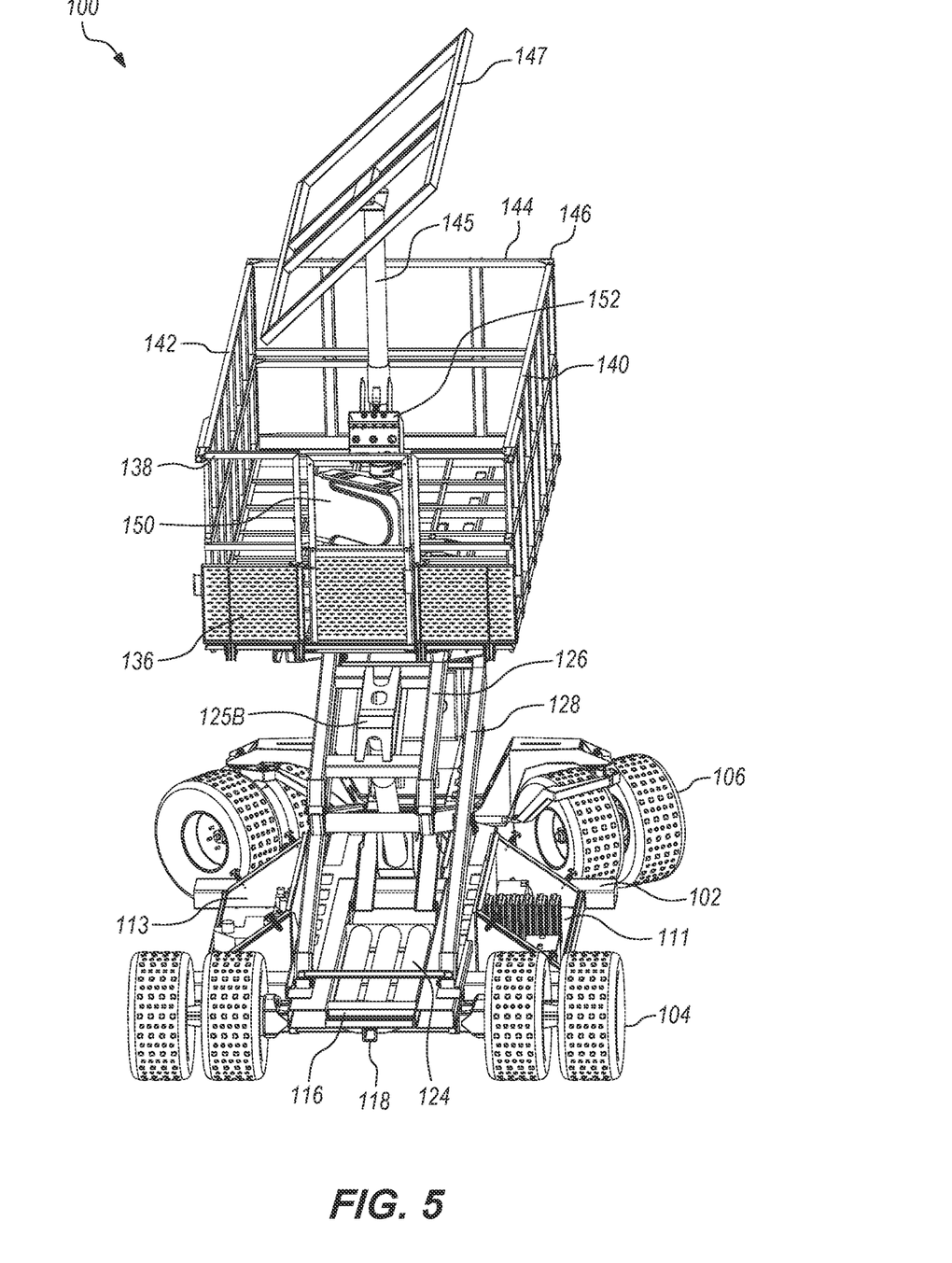
FIG. 5 illustrates a rear, top perspective view of a vehicle apparatus.
Figure 6:
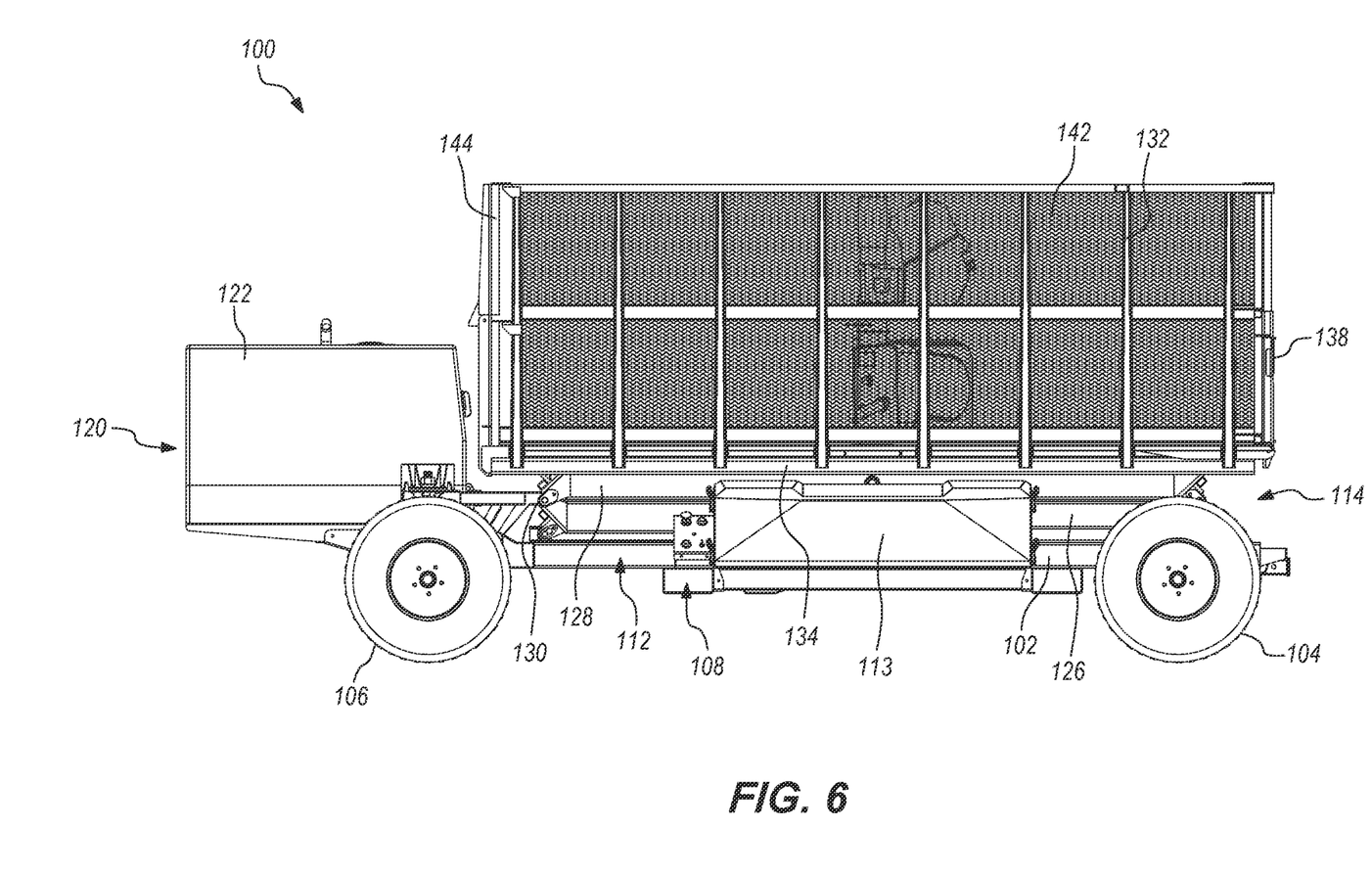
FIG. 6 illustrates a right side elevation view of a vehicle apparatus in a collapsed position.
Figure 7:
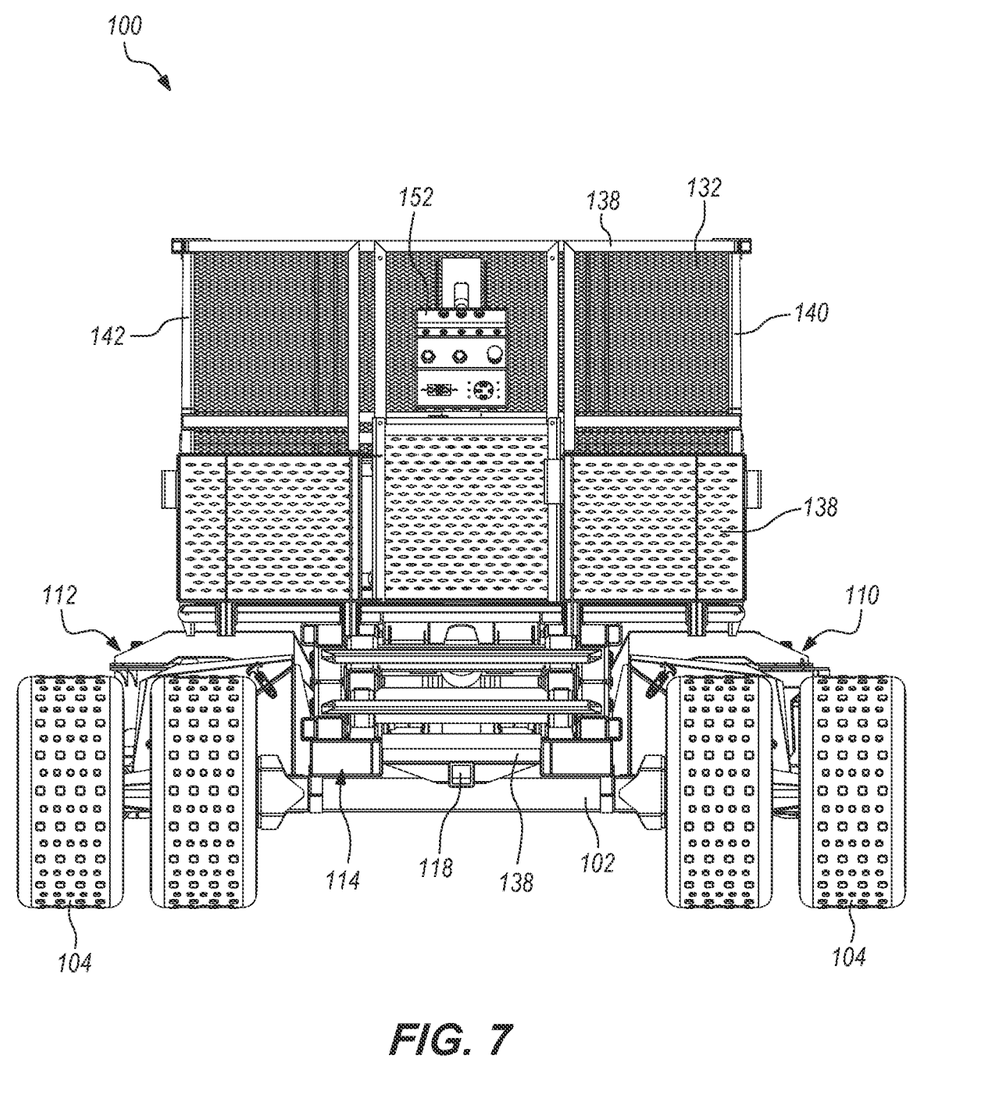
FIG. 7 illustrates a rear elevation view of a vehicle apparatus in a collapsed position.
Figure 8:
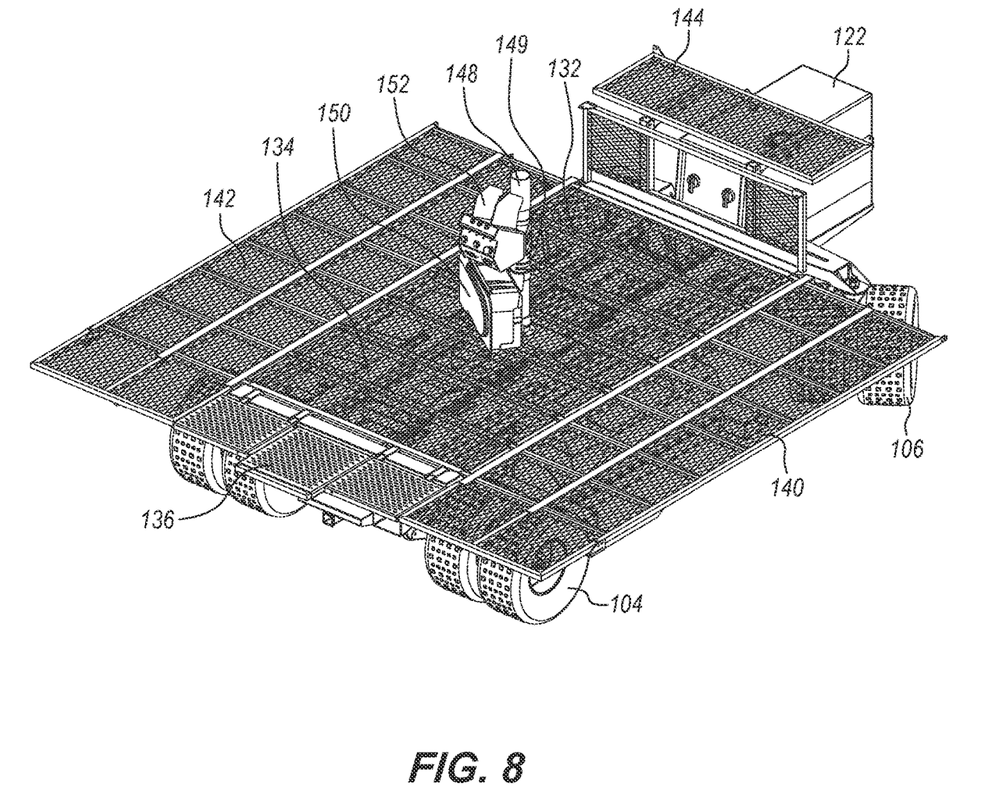
FIG. 8 illustrates a top perspective view of a vehicle apparatus in a collapsed position.

Extending vertically from the base 134 is a rotatable pedestal 148, which may receive various accessories. For example, as shown in FIGS. 3-5, a shaft 145 with a frame 147 may be coupled to the rotatable pedestal 148 and capable of assisting a user in holding heavy loads. One or more tie-off points 149, which, for example, may hold power cords or safety tethers, may be coupled to the pedestal 148 and capable of independently rotating 360 degrees. By having a user tethered to the pedestal 148, a user is able to freely move about the entire extended platform, significantly increasing the overall working area and reducing the need to relocate the vehicle apparatus 100, thereby increasing safety and efficacy. In addition, as best seen in FIG. 8, a welding reel 150 and man basket controls 152, which will be described more hereinbelow, may be coupled to the rotatable pedestal 148. The rotation of the pedestal 148 allows a user to weld or do any other type of work at any location on the man basket 132 without tangling the tether or cables. In some embodiments, some, or all components above the chassis 102 may be made of a lightweight aluminum material or other lightweight material, which allows the center of gravity of the vehicle apparatus 100 to remain as low as possible.

Figure 9:
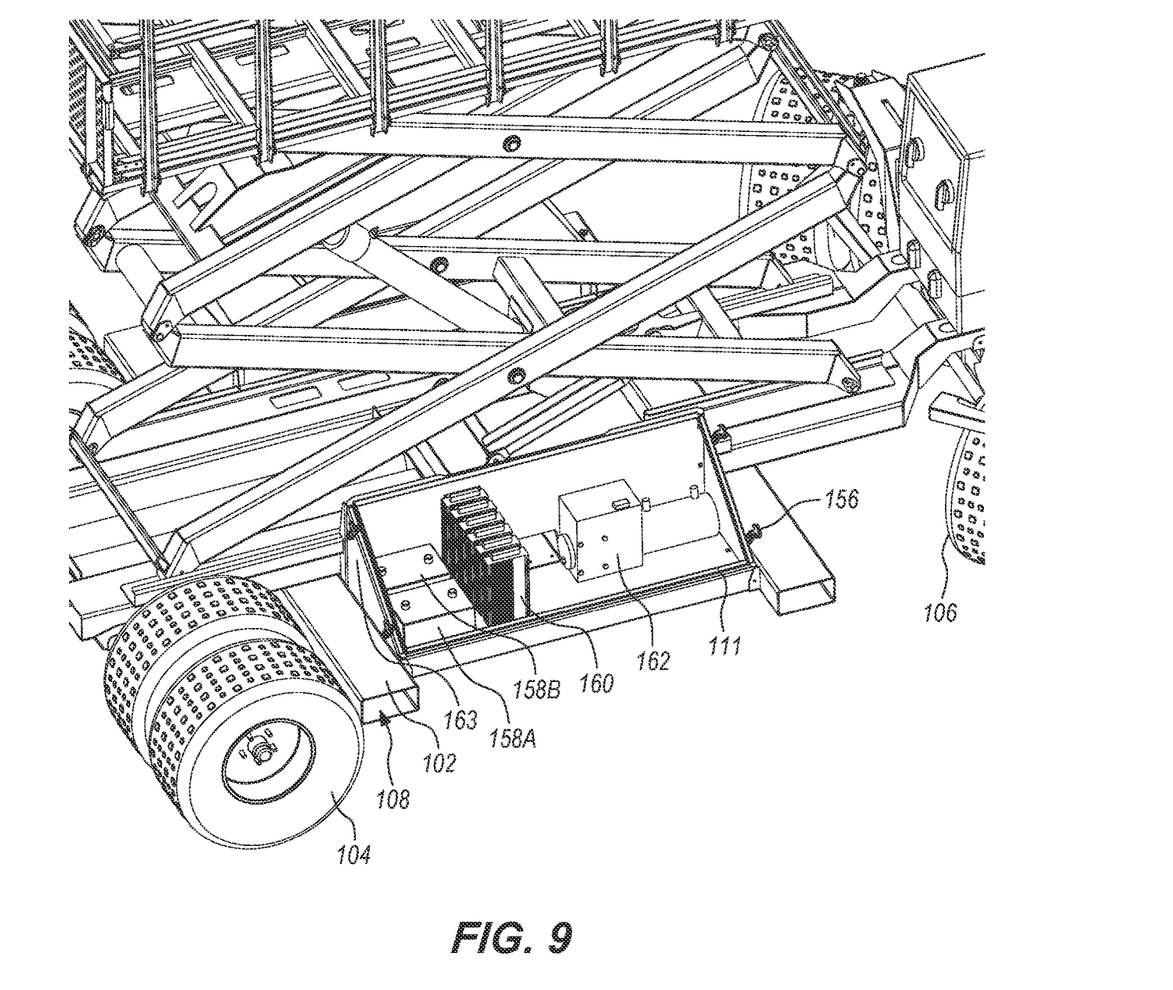
FIG. 9 illustrates a top perspective view of an electrical compartment coupled to a vehicle apparatus.

Furthermore, the electrical compartment 111 may comprise an electric cover lid 154 (shown in FIG. 1), which may be hingedly coupled thereto. Alternatively, the lid 154 may rest on top without the aid of hinges. The lid 154 may be locked via one or more rubber t-handle draw latches 156 (shown in FIG. 9) or any other type of locking mechanism. Referring to FIG. 9, to provide power to the vehicle apparatus 100, the electric compartment 111 may further comprise one or more batteries 158A, 158B positioned therein. The one or more batteries 158A, 158B connect to a power supply 160 (e.g., HEP 600-30 charger). The electric compartment 111 may further comprise an air compressor 162, which, in one embodiment, may be a 12V air compressor. Positioned externally on the electric compartment 111 is a power disconnect switch 163 that shutdowns the vehicle apparatus 100.

Figure 10:
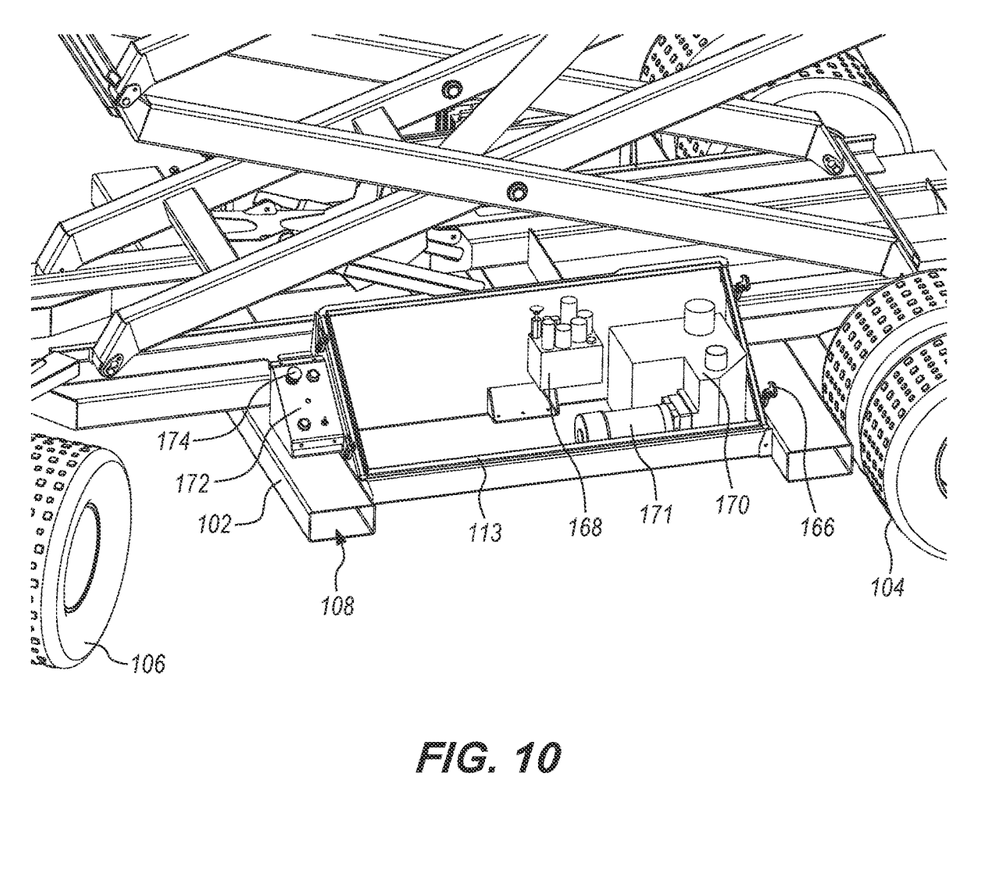
FIG. 10 illustrates a top perspective view of a hydraulic compartment coupled to a vehicle apparatus.

As shown in FIG. 10, the hydraulic compartment 113 comprises a hydraulic cover lid 164 (shown in FIG. 1) which may sit on top of or be hingedly coupled thereto. Similar to the electric cover lid 154, the hydraulic cover lid 164 (shown in FIG. 1) may be secured to the hydraulic compartment 113 via one or more rubber t-handle draw latches 166. The hydraulic compartment 113 may comprise a valve block 168 and a tank 170 with a hydraulic pump 171 coupled thereto. In addition, a ground control panel 172 may be coupled to an outer surface of the hydraulic compartment 113.

Figure 11:
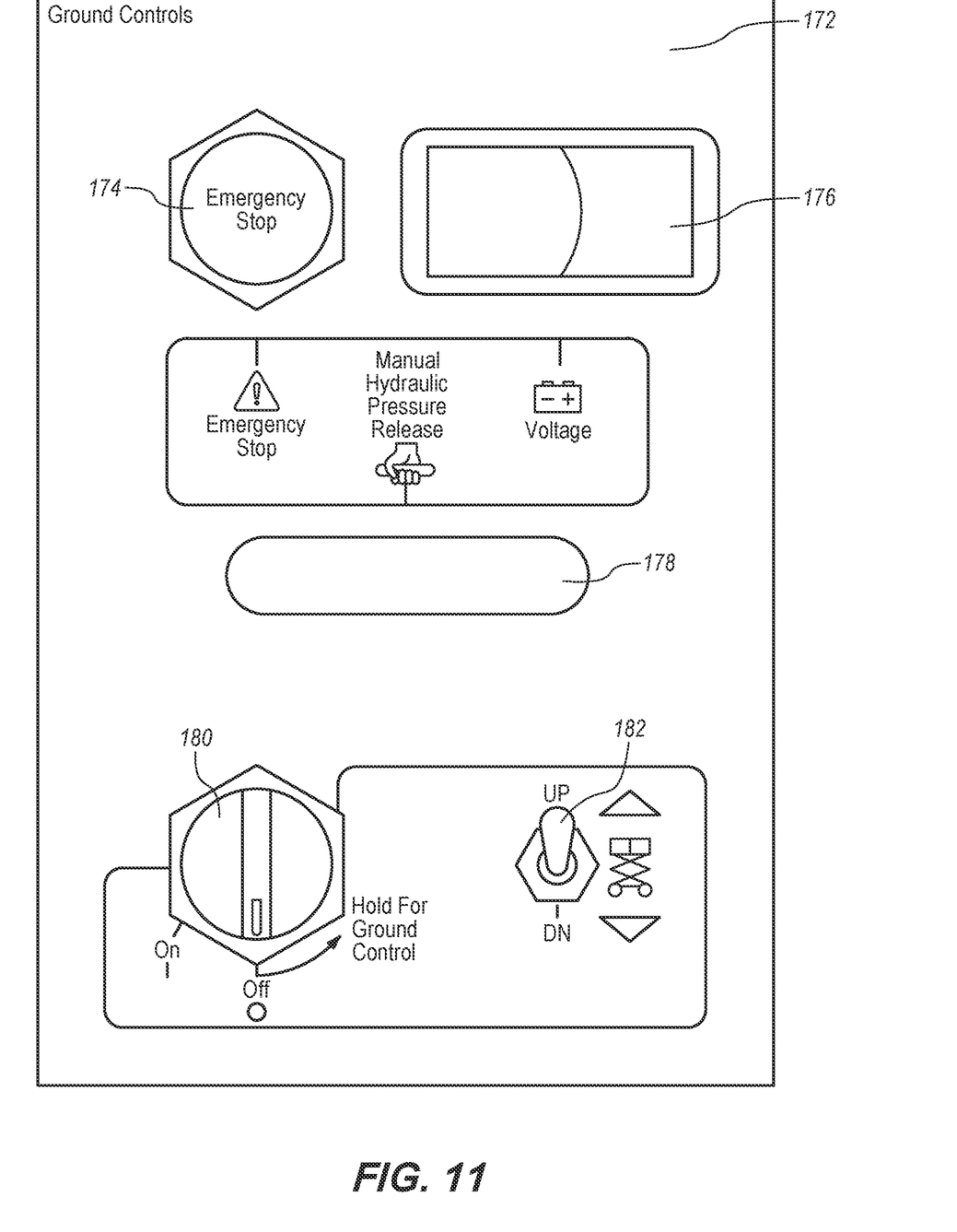
FIG. 11 illustrates a layout of ground controls of a vehicle apparatus.

In one embodiment, as illustrated in FIG. 11, the ground control panel 172 may comprise an emergency stop button 174, a voltage meter display 176, a manual hydraulic pressure release handle 178 to relieve all residual hydraulic fluid pressure, an on/off switch 180, and an up/down man basket toggle switch 182. The emergency stop button 174, when pushed down, stops all control functions of the vehicle apparatus 100. The voltage meter display 176 allows a user to view and monitor the state of the one or more batteries 158A, 158B. When there are multiple users, it may be desirable to activate the ground controls by moving the on/off switch 180 to an "on" position, thereby allowing a ground user to move the man basket 132 up and down on a y-axis via the up/down toggle switch.

Figure 12:
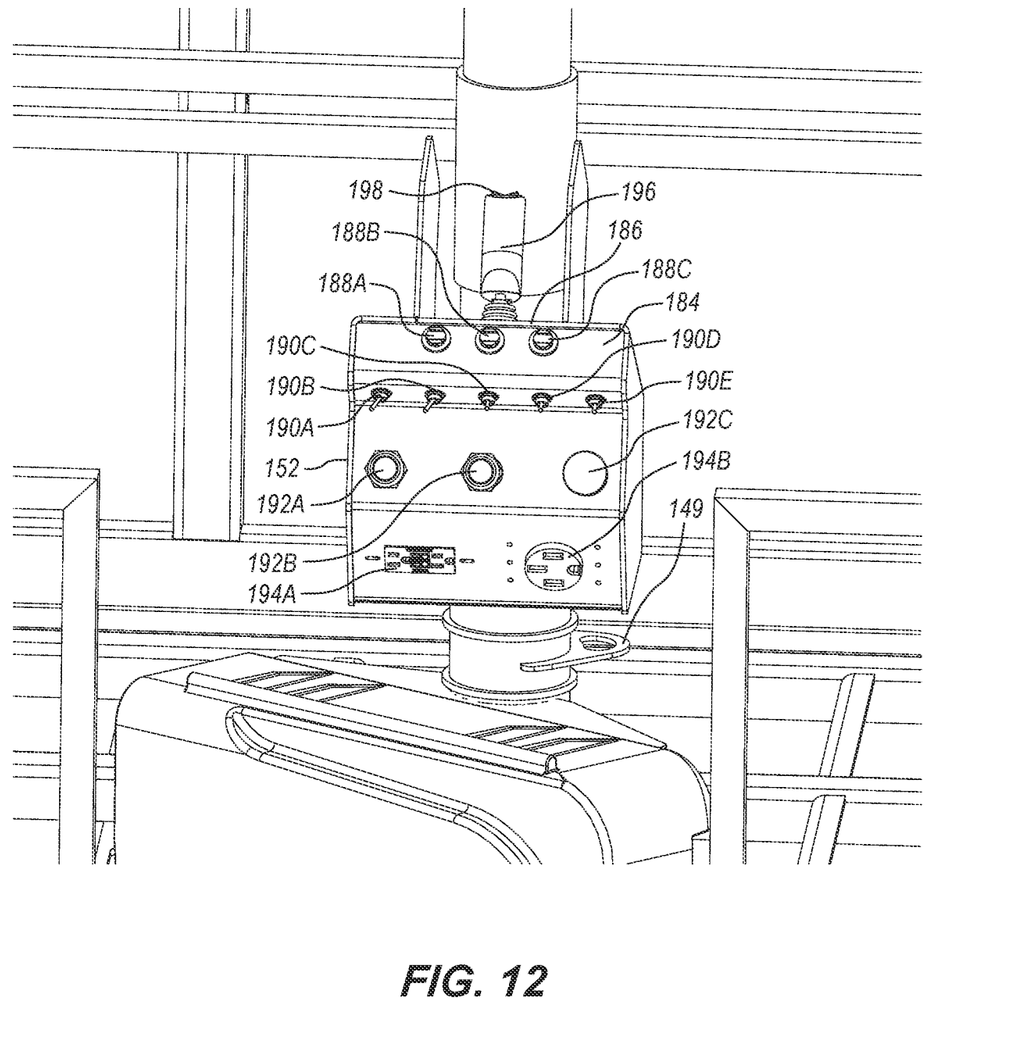
FIG. 12 illustrates a front perspective view of a platform control panel of a vehicle apparatus.
Figure 13:
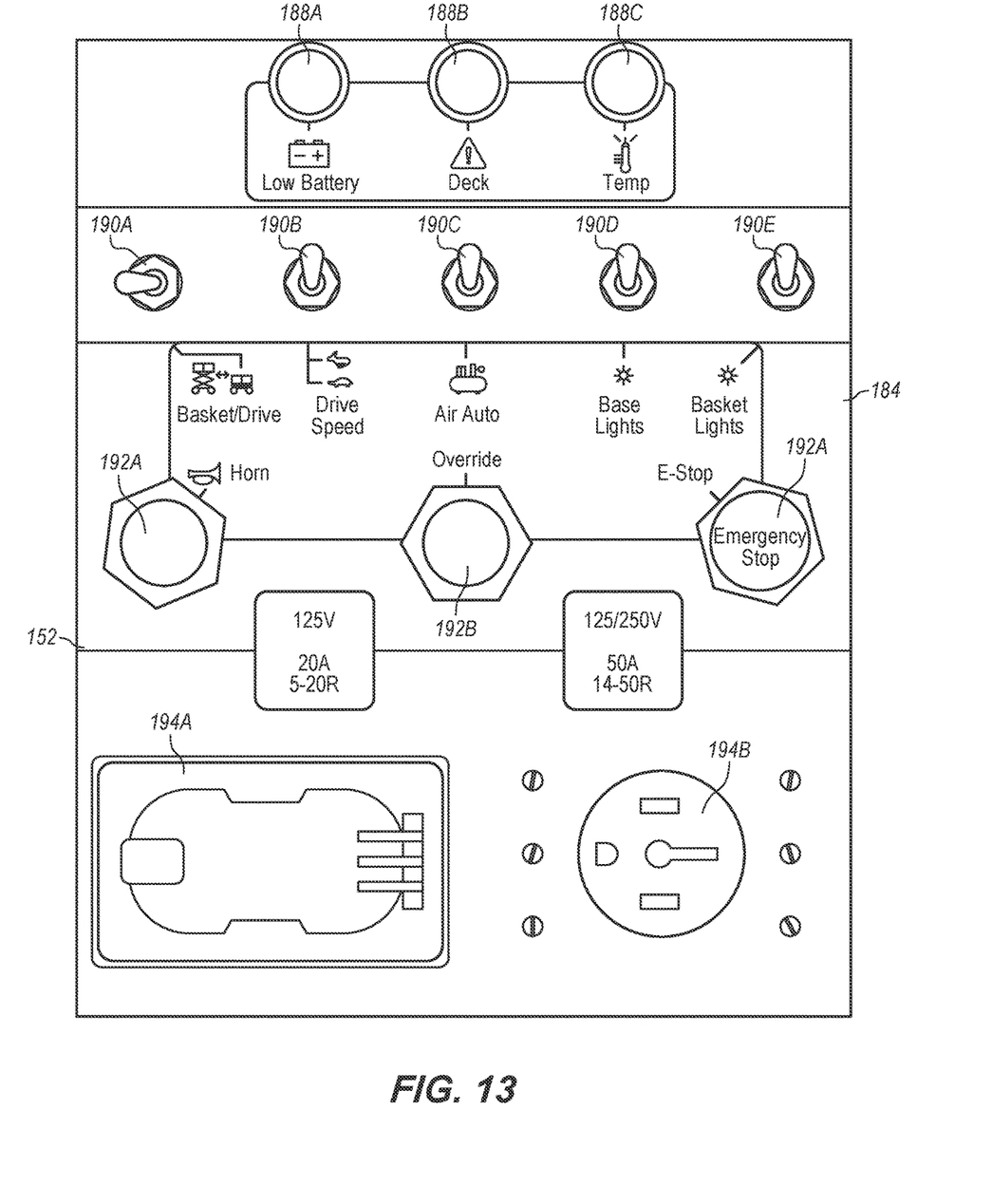
FIG. 13 illustrates a layout of a platform control panel of a vehicle apparatus.
Figure 14:
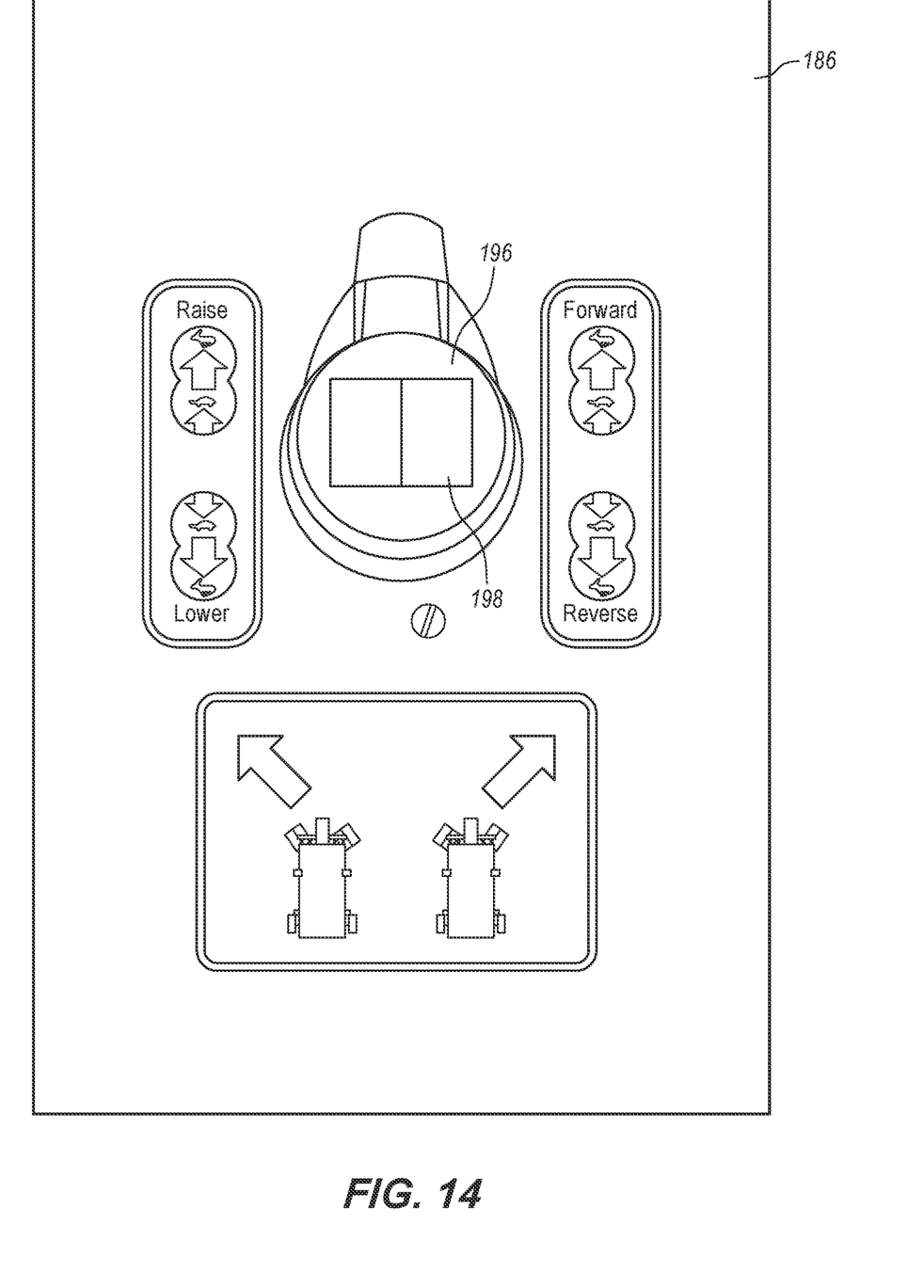
FIG. 14 illustrates a layout of a drive control panel of a vehicle apparatus.

Alternatively, as illustrated in FIGS. 12-14, a user may activate and control the vehicle apparatus 100 by using the man basket controls 152, which may comprise a platform control panel 184 and a drive control panel 186. The platform control panel 184, in some embodiments, may comprise a battery indicator light 188A to indicate a low battery charge, a deck indicator light 188B that indicates a failed sensor on the vehicle apparatus 100, and a temperature sensor 188C that indicates when the hydraulic oil has exceeded a predetermined temperature. The platform control panel 184 may also comprise a basket/drive switch 190A that allows a user to toggle between a drive mode and a raise/lower the man basket mode, a drive speed switch 190B that controls the speed of the vehicle 100 between slow and fast, an air switch 190C that controls the air compressor 162 to maintain the air pressure of the vehicle 100, a base light switch 190D to power on lights to illuminate direction of travel, and a basket light switch 190E to power on lights on the man basket 132 to illuminate a work area. Other buttons on the platform control panel 184 may include a horn button 192A, an override button 192B that allows slow temporary movement of all vehicle functions in case of a fault, and an emergency stop button 192C. A 125V power socket 194A that can charge or power hand tools and a 125/220 power socket 194B to power heavy duty equipment may also be positioned on the platform control panel 184. It will be appreciated that the power sockets 194A, 194B allow a user to use any equipment while in the man basket 132, such as drills and saws. Further, in some embodiments, the controls are programmed to limit travel speed and height extension when surfaces are detected to be unlevel, or if traction is lost.

The drive control panel 186 is operable in conjunction with the platform control panel 184. In other words, the functionality of the drive control panel 186 may be dependent upon the platform control panel 184. However, in some embodiments, the drive control panel 186 is not dependent on the platform control panel 184. The drive control panel 186 may comprise a joystick 196 with a direction switch 198 thereon. The joystick 196 can raise or lower the man basket 132 and steer the vehicle 100. For example, to raise or lower the man basket 132, the basket/drive switch 190A must be in the basket/drive position, allowing a user to move the joystick 196 forward to raise and backward to lower. In a similar manner, to drive the vehicle 100, a user moves the drive speed switch 190B to a desired drive speed position and moves the joystick 196 forward to drive forward and backward to reverse. When a user wants to turn left or right, the user may press the left side of the direction toggle switch 198 to go left and the right side to go right. While the drive controls are illustrated as being a joystick, it will be appreciated that a steering wheel, pedals, levers, or any other driving/steering mechanism may be used.

Accordingly, the vehicle apparatus 100 disclosed herein solves the problems in the art by providing an extended working area (i.e., greater walking surface area) for a user in connection with a rotatable tether for safety, along with the ability to hoist objects for placement between joists, mezzanines, or other locations.

It will also be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A vehicle apparatus comprising:
a chassis comprising a plurality of rear wheels coupled to a rear of the chassis and
a plurality of front wheels coupled to a front of the chassis;
an electrical compartment coupled to the chassis;
a hydraulic compartment coupled to the chassis;
a scissor assembly coupled to the chassis;
a man basket coupled to the scissor assembly and moveable on a y-axis via a hydraulic shaft coupled to and configured to actuate the scissor assembly;
wherein the man basket comprises an entrance gate, entrance rails, a first side dropdown platform extension, a second side dropdown platform extension, and a bench platform all of which are hingedly coupled to a base and are each configurable to a first, vertical position and a second, horizontal position configured to extend a walking area; and
a rotatable pedestal extending vertically from the base, the rotatable pedestal comprising one or more tie-off points configured to independently rotate 360 degrees, and a welding reel.

2. The vehicle apparatus of claim 1, wherein the rotatable pedestal comprises man basket controls.

3. The vehicle apparatus of claim 2, wherein the man basket controls comprise a platform control panel and a drive control panel.

4. The vehicle apparatus of claim 1, further comprising a shaft coupleable at a first end to, and longitudinally extending from, the rotatable pedestal, and a frame coupleable to a second end of the shaft.

5. The vehicle apparatus of claim 1, wherein the plurality of rear wheels and the plurality of front wheels are flotation tires.

6. The vehicle apparatus of claim 1, further comprising a platform step coupled to the chassis.

7. The vehicle apparatus of claim 1, further comprising a receiver hitch coupled to the chassis.

8. The vehicle apparatus of claim 1, further comprising a welder/generator coupled to the chassis.

9. The vehicle apparatus of claim 1, wherein the electrical compartment comprises one or more batteries, a power supply, and an air compressor.

10. The vehicle apparatus of claim 1, wherein the hydraulic compartment comprises a valve block, a tank, and a hydraulic pump.

11. The vehicle apparatus of claim 1, wherein the chassis comprises a plurality of forklift pockets that allow the vehicle apparatus to be transported by a forklift.

12. A vehicle apparatus comprising:
a chassis comprising:
a plurality of rear wheels coupled to a rear of the chassis,
a plurality of front wheels coupled to a front of the chassis, and
a plurality of forklift pockets that allow the vehicle apparatus to be transported;
an electrical compartment coupled to a first side of the chassis and interposed between the plurality of rear wheels and the plurality of front wheels;
a hydraulic compartment coupled to a second side of the chassis and interposed between the plurality of rear wheels and the plurality of front wheels;
a scissor assembly coupled to the chassis;
a man basket coupled to the scissor assembly and moveable on a y-axis via a hydraulic shaft coupled to, and configured to actuate, the scissor assembly; and
ground controls to raise and lower the man basket;
the man basket comprising an entrance gate, entrance rails, a first side dropdown platform extension, a second side dropdown platform extension, and a bench platform all of which are hingedly coupled to a base and are each configurable to a first, vertical position and a second, horizontal position;
wherein when in the first, vertical position, the entrance gate, the entrance rails, the first side dropdown platform extension, and the second side dropdown platform extension are perpendicular to the base forming a first walking area with a first surface area;
wherein when in the second, horizontal position, the entrance gate, the entrance rails, the first side dropdown platform extension, and the second side dropdown platform extension extend horizontally to the base forming a second walking area with a second surface area greater than the first walking area; and
a rotatable pedestal extending vertically from the base, the rotatable pedestal comprising one or more tie-off points configured to independently rotate in relation to the rotatable pedestal, and a welding reel.

13. The vehicle apparatus of claim 12, wherein the rotatable pedestal comprises man basket controls.

14. The vehicle apparatus of claim 13, wherein the man basket controls comprise a platform control panel and a drive control panel.

15. The vehicle apparatus of claim 14, wherein the drive control panel comprises a joystick that maneuvers the vehicle and raises and lowers the man basket.

16. The vehicle apparatus of claim 12, further comprising a shaft coupleable at a first end to, and longitudinally extending upwardly from, the rotatable pedestal, and a frame coupleable to a second end of the shaft, the frame suspended above the man basket.

\* \* \* \* \*